United States Patent [19]
Schonlau et al.

[11] Patent Number: 6,050,174
[45] Date of Patent: Apr. 18, 2000

[54] VACUUM SERVO BRAKE FOR MOTOR VEHICLES

[75] Inventors: Jürgen Schonlau, Walluf; Kai-Michael Graichen, Langen; Kurt Saalbach, Mörfelden-Walldorf; Wilfried Wagner, Hüttenberg, all of Germany

[73] Assignee: ITT Manufacturing Enterprises, Inc., Wilmington, Del.

[21] Appl. No.: 08/981,115

[22] PCT Filed: Apr. 16, 1996

[86] PCT No.: PCT/EP96/01590

§ 371 Date: Feb. 23, 1998

§ 102(e) Date: Feb. 23, 1998

[87] PCT Pub. No.: WO97/01470

PCT Pub. Date: Jan. 16, 1997

[30] Foreign Application Priority Data

Jun. 24, 1995 [DE] Germany ............... 195 23 021

[51] Int. Cl.$^7$ .............. F01B 25/16; F01B 19/00
[52] U.S. Cl. .............. 92/169.3; 60/403
[58] Field of Search ........... 92/169.3, 169.2; 60/403

[56] References Cited

U.S. PATENT DOCUMENTS

| | | | |
|---|---|---|---|
| 4,256,016 | 3/1981 | Thomas | 92/169.2 |
| 4,270,438 | 6/1981 | Thomas et al. | 92/165 PR |
| 5,570,622 | 11/1996 | Heinrichs et al. | 92/165 R |
| 5,588,349 | 12/1996 | Gautier et al. | 92/169.3 |

FOREIGN PATENT DOCUMENTS

| | | |
|---|---|---|
| 2942024 | 5/1980 | Germany . |
| 3220988 | 11/1988 | Germany . |
| 2920249 | 9/1990 | Germany . |
| 4204419 | 8/1993 | Germany . |
| 4332611 | 5/1995 | Germany . |

*Primary Examiner*—F. Daniel Lopez
*Attorney, Agent, or Firm*—Rader, Fishman & Grauer PLLC

[57] ABSTRACT

The deformation behavior of a transmission pin transmitting forces to the body fender of a motor vehicle and being found in the vacuum brake booster, is improved by equipping the transmission pins with predetermined breaking points or segments with smaller diameters.

11 Claims, 4 Drawing Sheets

6,050,174

1

VACUUM SERVO BRAKE FOR MOTOR VEHICLES

BACKGROUND OF THE INVENTION

The invention relates to a vacuum brake booster for motor vehicles with a booster shell comprising two opposing shell halves, with at least one moveable wall that subdivides the interior space of the booster shell, as well as with two transmission pins that extend in parallel to the longitudinal axis of the vacuum brake booster from one shell half to the shell half located on the other side of the moveable wall, with the shell halves being sealed against the moveable wall and having at their ends fastening elements for the body wall or a master brake cylinder, which is connected to the vacuum brake booster.

This type of vacuum brake booster is known from published German patent application DE 28 45 794. A disadvantageous characteristic of this known vacuum brake booster is its unfavorable deformation behavior during accidents that lead to distortion of the front section of the vehicle. This is caused by transmission pins which increase the stiffness of the booster shell, are of a relatively large diameter, and offer excessive resistance to deformation during accidents.

Consequently, the object of this invention is to propose measures specific to a vacuum brake booster of the type mentioned initially that allow for substantial improvement in deformation behavior during accidents.

SUMMARY OF THE INVENTION

Initially, this object is achieved by equipping the transmission pins with at least one predetermined breaking point.

A second solution of the underlying object of the invention consists in the transmission pins having at least one segment with a smaller cross-section.

Finally, a third solution of the underlying object of the invention consists in the fact that the transmission pins are designed as having two parts and that each transmission pin consists of two telescoping parts linked by a connecting piece that transmits both compressive and tensile forces and is detachable by application of pressure in excess of a predetermined value.

Additional attributes and advantages of the invention follow from the description of five illustrative examples based on the enclosed drawings.

DETAILED DESCRIPTION OF THE DRAWINGS

Figure 1:
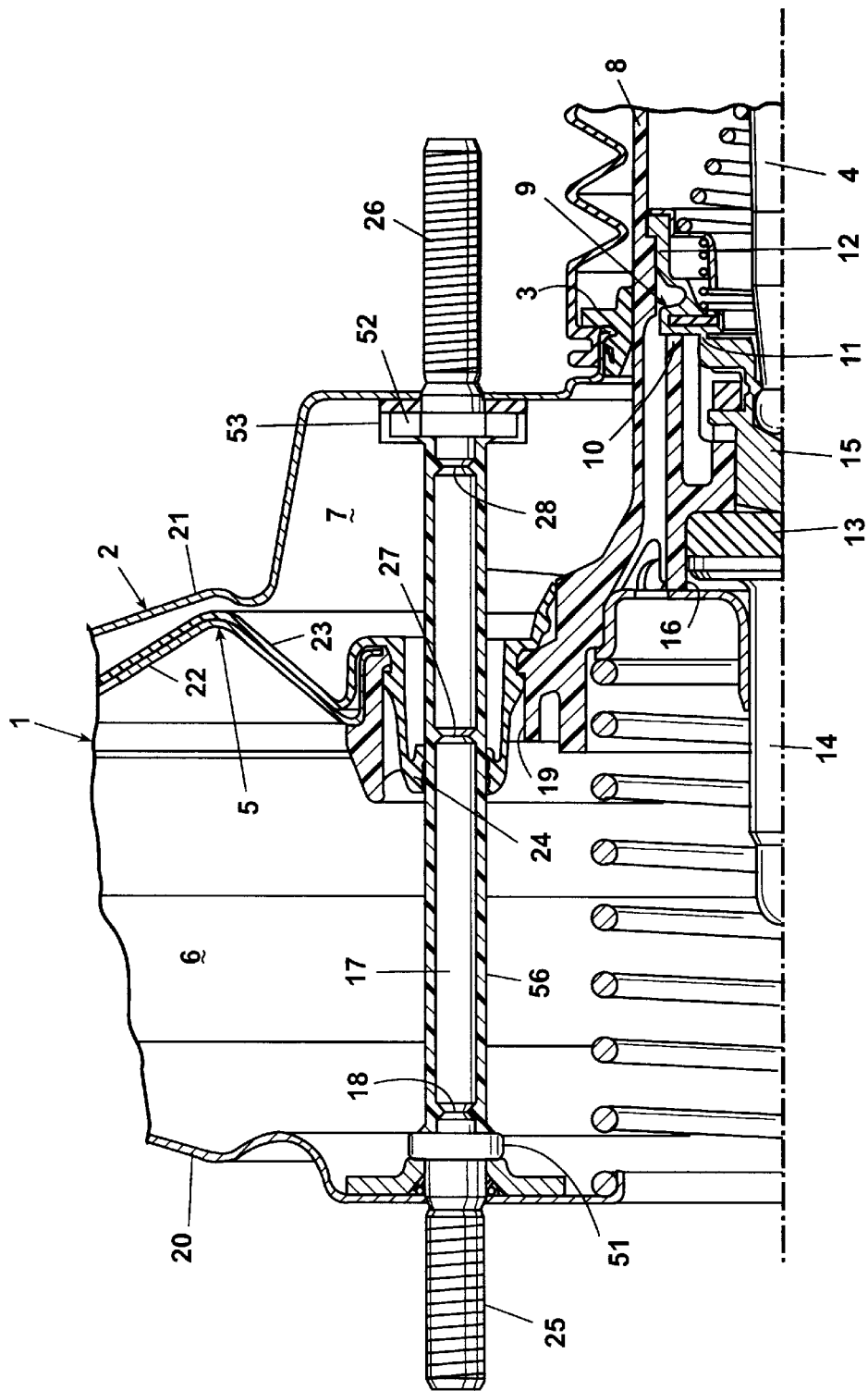
FIG. 1 shows a first embodiment of the vacuum brake booster according to the invention.
Figure 2:
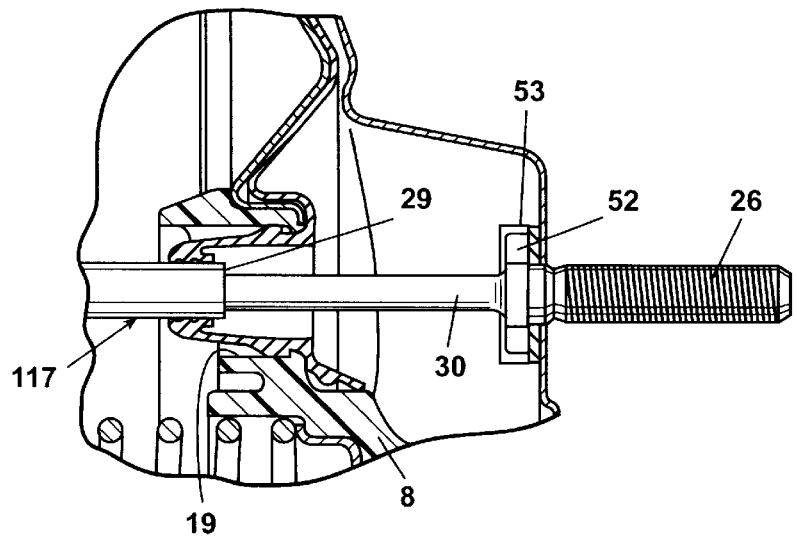
FIGS. 2 to 5 show a second, a third, a fourth, and a fifth embodiment of the subject of the invention.

The vacuum brake booster 1 according to invention depicted in the drawing includes a booster shell 2 formed by two interconnected shell halves 20, 21, with the half depicted on the left 20 in FIGS. 1 and 2 being connected to a master brake cylinder, which is not shown, while the shell half depicted on the right 21 is connected to the body wall a motor vehicle, which is also not shown in the figure. A control valve 9 positioned inside a timing case 8 which glides inside a floating ring seal 3 in a cylindrical extension of the right shell half 21 can be activated by an input element 4 linked to a brake pedal not depicted in the figure. At its ends facing away from the input element 4, the timing case 8 bears a moveable wall 5 which consists of a disk membrane 22 and an adjacent rolling membrane 23 and which divides the interior of the brake booster shell 2 into a vacuum chamber 6 capable of being evacuated and a working chamber 7, with the control valve 9 establishing the connection between the working chamber 7 and the vacuum chamber 6 or the atmosphere. Preferably, the control valve 9 consists of two concentrically positioned ring-shaped sealing seats 10, 11 that interact with a rotationally symmetrical elastic valve unit 12, such as a disk valve, or come into contact with the vacuum brake booster 1 when the latter is in its release position. The first sealing seat 1 which, when opened, allows for a connection between the two chambers 6, 7, is attached to the timing case 8. The second sealing seat 11 which, when opened, allows for ventilation of the working chamber 7, is attached to a valve piston 15 actively connected to the input element 4 and positioned in the timing case 8. The valve piston 15 is actively connected to an elastic rubber reaction disk 13, which is positioned in a cylindrical groove 16 in the timing case 8 and allows for the transfer of the operating force introduced at the input element 4 and the booster force provided by the moveable wall 5 to an output element 14 that interacts with a master brake cylinder piston, which is not depicted.

Preferably, the booster shell 2 contains two rod-shaped transmission pins positioned in parallel to the longitudinal axis of the brake booster, one of which is depicted in the figure and labeled with reference code 17. As the timing case 8 carrying the moveable wall 5 travels along this connecting pin 17, it can move freely in an axial direction during operation. The sealing of the transmission pins 17 in the openings 19 in the timing case 8 is preferably achieved with one-piece sliding seals formed by the rolling membrane 23, with the sliding seal facing the transmission pin 17 shown in the figure and labeled with reference code 24.

To secure the aforementioned master brake cylinder to the shell half 20 depicted on the left in FIG. 1, or to secure the vacuum brake booster 1 to the fender of the vehicle, fastening elements 25, 26 at the ends of the transmission pins 17 are assigned to the two shell halves 20, 21.

To ensure that the booster shell 2 is deformed in a defined manner in the event of an accident causing deformation of the front section of the vehicle, the transmission pins 17 are equipped with three radial grooves or notches 18, 27, 28. While grooves or notches 18 and 28 are located in the vicinity of the fastening elements 25, 26, the third groove or notch 27 is located in the vicinity of the openings 19 in the timing case 8 through which the transmission pin 17 passes and which accept the aforementioned sliding seal 24. Preferably, the grooves or notches 18, 27, 28, whose effects on power transmission are known to professionals, may be triangular, square or semi-circular in cross section, although other cross-sectional shapes are certainly also conceivable. It is also preferable to envelope the transmission pins 17 in a plastic coating 56 with gliding properties.

Another method of achieving the desired deformation response on the part of the brake booster consists in the fact that two adjacent milled incisions are made in the terminal segments of the transmission pins, while an additional milled incision, preferably displaced by 180°, is made in the area between the two incisions mentioned above. It is particularly advantageous if the depth of the incisions is greater than one-half the diameter of the transmission pins. To protect the seal that seals the moveable wall against the transmission pin from being damaged near the milled incisions, the transmission pin should be equipped with a sleeve, such as a plastic tube.

Discontinuity in the course of the strain lines may also be achieved with a heel. In the embodiment depicted in FIG. 2, the partially visible transmission pin 117 has a radial heel 29 near the opening 19 in the timing case 8. At this point, the transmission pin continues in a segment 30 with a smaller diameter, the end of which consists of a fastening element 26 that connects to the vehicle fender. Naturally, a second segment with a smaller diameter, not depicted in the figure, may be included at the end of the transmission pin 117 adjoining the master brake cylinder, which is also not depicted in the figure. Positioning yet another segment with a reduced diameter between these segments is certainly conceivable. These segments may also be radially displaced in relation to the axis of the transmission pin 117, i.e., positioned outside the axis. To introduce the compression force in the transmission pins 17, 117, which occurs as a result of the pneumatic pressure differential acting on the booster shell 2, these pins have radial extensions 51, 52 which are proximate to the fastening elements 25, 26 and sit close to the inner surfaces of the corresponding shell halves 20, 21. The extension 52 shown in the right-hand section of the figure interacts with a sheet metal flange 53 to prevent twisting of the transmission pins 17, 117 in the booster shell 2.

Figure 3:
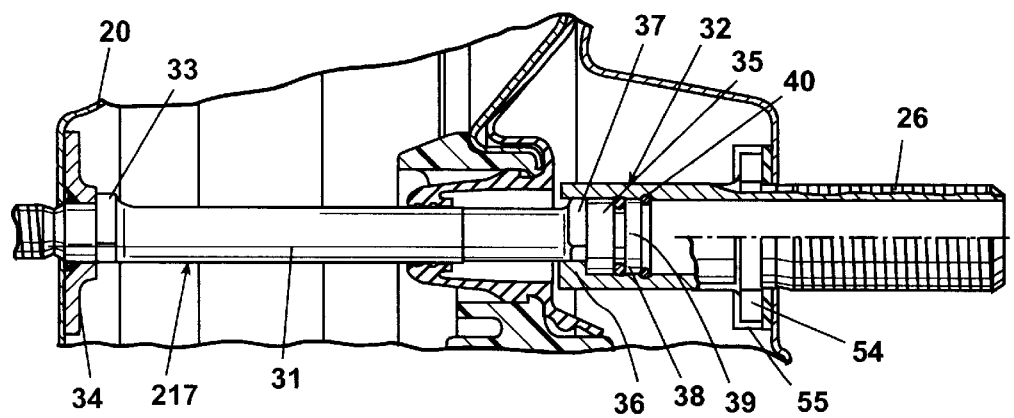

In the embodiment of the invention depicted in FIG. 3, the transmission pin 217 consists of two segments, a preferably cylindrical first segment 31, which protrudes axially into the vacuum chamber 6, and a second segment 32, which is designed in the shape of a shell and telescopically accepts the end of the first segment 31 that faces the vehicle body.

To transmit the compression forces created during operation of the brake booster, the end of the first segment 31 adjoining the master cylinder is equipped with a section that has a larger diameter or a polygonal profile 33. A stiffening disk 34 adjoining the shell half 20 depicted on the left in the figure is axially supported by this section. At the end that projects into the second segment 32, the first segment 31 has a radial collar 35 that serves the aforementioned purpose and interacts with a radial step 36 fashioned into the second segment 32. A second polygonal section 37 prevents twisting of the first segment 31 in relation to the second segment 32, while both segments 31, 32 are sealed against one another by means of a gasket 38 positioned in a circumferential groove 39 in the collar 35.

To allow for the transmission of compression force occurring at a point below the modulation point of the brake booster through the transmission pin 217, the end of the first segment 31 is axially supported by a retaining ring 40 included in the second segment 32.

In response to the effects of an accident-induced axial power component on the first segment 31, this segment pushes itself into the second segment 32 after the retaining ring 40 has been pushed into the corresponding groove in the second segment 32. The retaining ring 40 in the second segment must be positioned in such a way that it can transfer the aforementioned compression force and does not slip out of its groove until a point is reached that is just above this force level.

Figure 4:
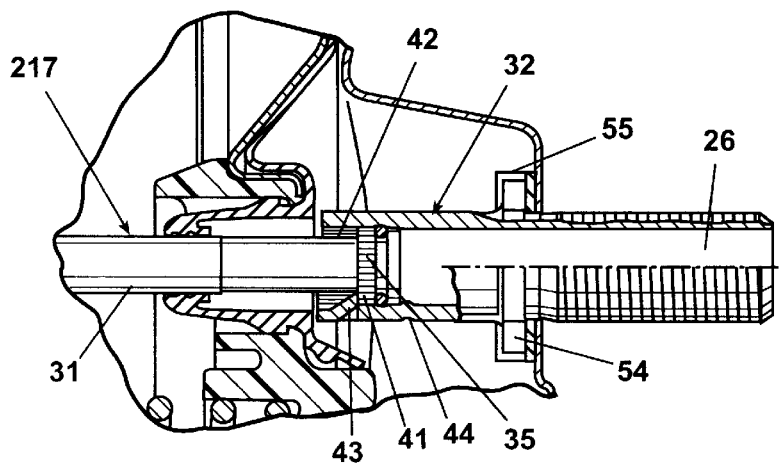

In the embodiment depicted in FIG. 4, the first segment 31 is prevented from twisting in relation to the second segment 32 by means of knurling 41 fashioned into the collar 35, as well as by means of internal knurling 42 inside the second segment 32. At least one notch 43 interacting with the collar 35 provides for transmission of the aforementioned tensile force to the second segment 32, while the compression forces are assumed by one or more incisions evenly distributed along the perimeter of the second segment 32. The second segment 32 is prevented from twisting in relation to the booster shell 2 or in relation to the shell half 21 corresponding to the second segment 32 by means of a radial extension 54 fashioned into the second segment 32, which interacts with a sheet metal flange 55 attached to the inner surface of the shell half 21 in a manner similar to that achieved in the embodiments depicted in FIGS. 1 and 2.

Figure 5:
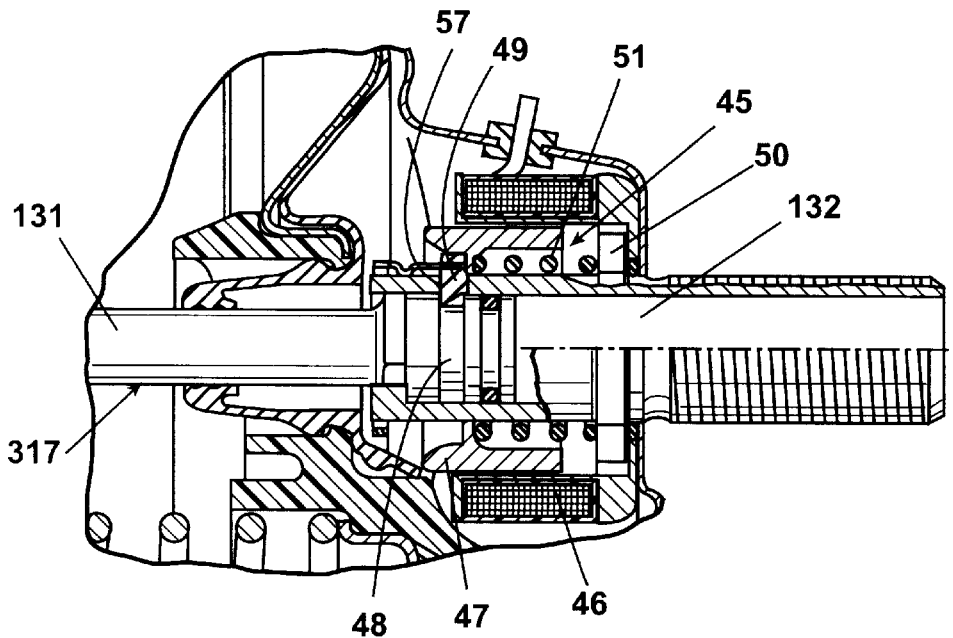
Figure 6:
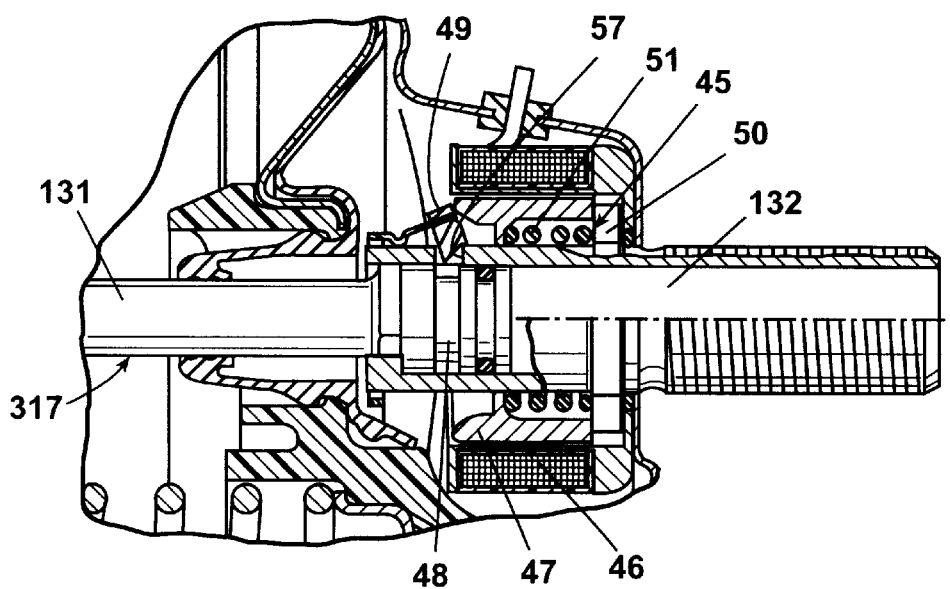
FIG. 6 shows the unlocking procedure for the electromagnetic locking mechanism acting between the two parts of the transmission pin depicted in FIG. 5.

FIGS. 5 and 6 depict a fourth variant of the object of the invention, in which a electromagnetic locking mechanism 45 is positioned between the two segments 131, 132 of the transmission pin 317. The locking mechanism 45, which, in the absence of current, transmits the aforementioned compression forces and provides for a positive fit between the two segments 131, 132 of the transmission pin 317, preferably consists of a solenoid 46, 47 and a detent pawl 49 that fits into a radial groove 48 in the first segment 131, extends radially along a recess 57 fashioned into the second segment 132, and engages the two segments 131, 132. A pressure spring 51 positioned between a radial collar 50 fashioned onto the second segment 132 and the tubular armature 47 of the solenoid 46 prestresses the armature 47 in such a way that it is axially pressed against the detent pawl 49 and encompasses it radially, thus effecting an interlocking connection between the two segments 131, 132. In the event of an accident, a crash sensor (not depicted), such as an airbag sensor, is activated, allowing current to flow to the electromagnetic coil 46. As a result, the armature 47 of the solenoid 46, 47 is pushed toward the right in the figure, which counters the action of the pressure spring 51 and releases the detent pawl 49, which would otherwise be prestressed in an upward direction, so that the interlocking connection between the two segments 131, 132 is dissolved and the first segment 131 can be inserted into the second segment 132.

Figure 7:
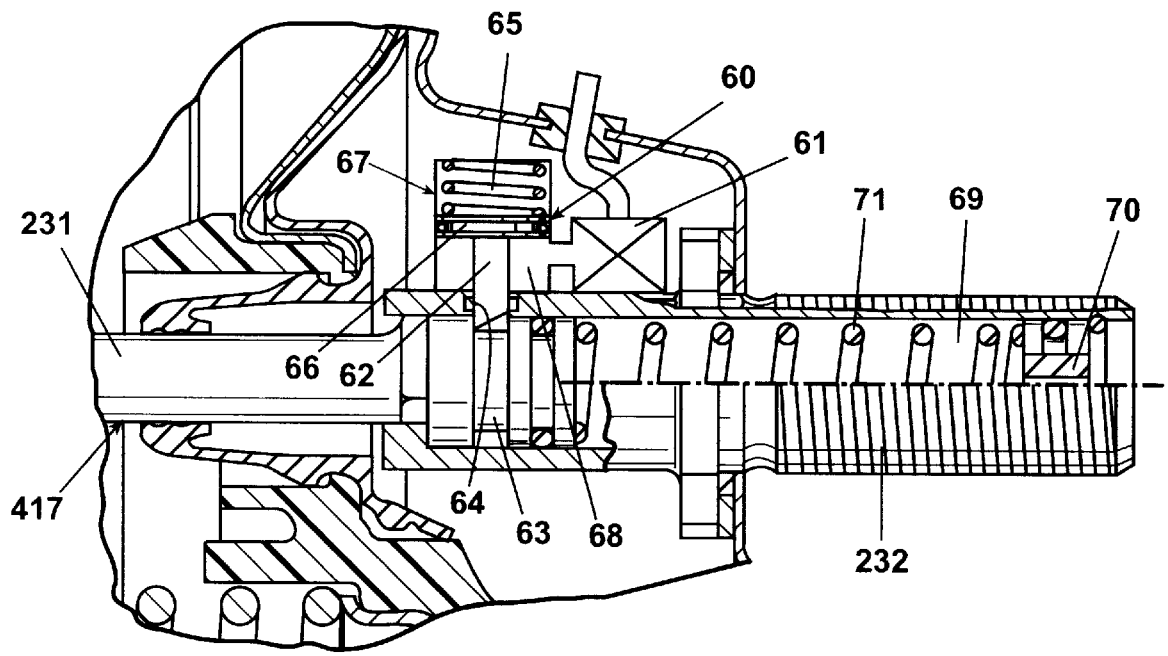
FIG. 7 shows a sixth embodiment of the subject of the invention.

Finally, a fifth embodiment of the invention is depicted in FIG. 7 in which a locking mechanism 60 positioned between the two segments 231, 232 of the transmission pin 417 can be activated by ignition of an explosive charge. In this case, the locking mechanism 60 consists primarily of a locking element 32, which is preferably positioned at a right angle to the axis of the transmission pin 417 and extends radially along a recess 64 fashioned into the second segment 232 and engages a radial groove 63 in the first segment 231 which, consequently, is axially supported by the locking element 62. The locking element 62, which is prestressed by means of a compression spring 65, is in a transmissive relationship with a pneumatic piston 66, which is encased by a shell 67 that terminates in a pneumatic pressure chamber 68 attached to the second segment 232. A sudden increase in pressure can be achieved in this pneumatic pressure chamber 68 by ignition of the explosive charge 61, which may, for example, be triggered by a crash sensor not depicted in the figure. In response to the resulting blast wave, the piston 66 is displaced in opposition to the force generated by the compression spring 65, so that the first segment 231 can be released and inserted into the second segment 232. To achieve effective shock absorption in the first segment 231, it is preferably designed as a pneumatic piston that terminates in a pneumatic chamber 69 in the second segment 232 which is connected to the atmosphere by means of a throttle valve 70 installed at the end of the second segment 232. To ensure fail-safe operation, particularly in the event of defective ignition of the explosive charge 61, a compression spring 71 is positioned between the two segments 231, 232, preferably in the pneumatic chamber 69, the force of which prevents potential deformation of the booster shell in response to the effects of pneumatic forces resulting from the pressure differential acting on the booster shell.

We claim:

1. A vacuum brake booster for motor vehicles with a longitudinal axis and a booster shell comprising two opposing shell halves, with at least one moveable wall between the shell halves that divides the booster shell into two chambers, as well as with two transmission pins that extend in parallel to the longitudinal axis from one shell half to the shell half located on the other side of the moveable wall, with the shell havles being sealed against the moveable wall and having at their ends fastening elements for other parts connected to the vacuum brake booster, wherein the transmission pins each have at least one predetermined breaking point wherein each predetermined breaking point consists of a radial incision.

2. A vacuum brake booster according to claim 1, wherein the incisions are fashioned in the vicinity of the fastening elements.

3. A vacuum brake booster according to claim 1, wherein the incisions are fashioned in the vicinity of the opening in the moveable wall through which the transmission pins pass and beyond the range of motion of a seal that seals the moveable wall against the transmission pins.

4. A vacuum brake booster according to claim 1, wherein the incisions are fashioned as circumferential grooves.

5. A vacuum brake booster according to claim 1, wherein the incisions are fashioned as milled incisions, the depth of which is greater than one-half the diameter of the transmission pins.

6. A vacuum brake booster according to claim 5, wherein two adjacent milled incisions are made in the vicinity of the fastening elements and that a third milled incision, which is displaced against the adjacent milled incisions by 180°, is made in the area outside the area covered by a seal that seals the moveable wall against the transmission pin.

7. A vacuum brake booster according to claim 5, wherein the transmission pins are encased in plastic tubes.

8. A vacuum brake booster according to claim 1, wherein the transmission pins are enveloped in a plastic coating with gliding properties.

9. A vacuum brake booster according to claim 1, wherein the transmission pins have radial extensions in the vicinity of the fastening elements, which are axially supported by the booster shell.

10. A vacuum brake booster according to claim 9, wherein one of the extensions interacts with a sheet metal flange attached to the shell half allocated to it to prevent twisting of the transmission pins in relation to the booster shell.

11. A vacuum brake booster for motor vehicles with a longitudinal axis and a booster shell comprising two opposing shell halves, with at least one moveable wall between the shell halves that divides the booster shell into two chambers, as well as with two transmission pins that extend in parallel to the longitudinal axis from one shell half to the shell half located on the other side of the moveable wall, with the shell havles being sealed against the moveable wall and having at their ends fastening elements for other parts connected to the vacuum brake booster, wherein the transmission pins each have at least one predetermined breaking point wherein the transmission pins are enveloped in a plastic coating with gliding properties.

* * * * *

UNITED STATES PATENT AND TRADEMARK OFFICE
CERTIFICATE OF CORRECTION

PATENT NO. : 6,050,174
DATED : April 18, 2000
INVENTOR(S) : Jurgen Schonlau; Kai-Michael Graichen; Kurt Saalbach; Wilfried Wagner It is certified that error appears in the above-identified patent and that said Letters Patent is hereby corrected as shown below:

Column 5, claim 1,
Line 16, change, "havles" to -- halves --.

Column 6, claim 11,
Line 27, change, "havles" to -- halves --.

Signed and Sealed this

Twenty-fifth Day of December, 2001

*Attest:*

*Attesting Officer*

JAMES E. ROGAN
*Director of the United States Patent and Trademark Office*